(12) United States Patent
Ha (10) Patent No.: US 12,301,021 B2
(45) Date of Patent: May 13, 2025

(54) MULTI-WAVELENGTH WIRELESS OPTICAL CHARGING SYSTEM AND METHOD

(71) Applicant: INDUSTRY-ACADEMIA COOPERATION GROUP OF SEJONG UNIVERSITY, Seoul (KR)

(72) Inventor: Jin Yong Ha, Seoul (KR)

(73) Assignee: INDUSTRY-ACADEMIA COOPERATION GROUP OF SEJONG UNIVERSITY, Seoul (KR)

( * ) Notice: Subject to any disclaimer, the term of this patent is extended or adjusted under 35 U.S.C. 154(b) by 0 days.

(21) Appl. No.: 17/887,105

(22) Filed: Aug. 12, 2022

(65) Prior Publication Data

US 2023/0216351 A1    Jul. 6, 2023

(30) Foreign Application Priority Data

Dec. 30, 2021    (KR) .......................... 10-2021-0192389

(51) Int. Cl.
*H02J 50/30*    (2016.01)
*G02B 5/128*    (2006.01)

(52) U.S. Cl.
CPC .............. *H02J 50/30* (2016.02); *G02B 5/128* (2013.01)

(58) Field of Classification Search
CPC ....... H02J 50/80; G02B 1/11; G02B 26/0816; G02B 27/142; G02B 5/128
See application file for complete search history.

(56) References Cited

U.S. PATENT DOCUMENTS

| 2011/0204711 | A1* | 8/2011 | Norconk | H02J 50/12 307/3 |
| 2014/0147079 | A1* | 5/2014 | Doerr | G02B 6/34 385/37 |
| 2019/0229558 | A1* | 7/2019 | Pigeon | A61N 1/3787 |
| 2020/0242020 | A1* | 7/2020 | Ha | G02B 27/30 |

\* cited by examiner

*Primary Examiner* — Kevin K Pyo
*Assistant Examiner* — Don J Williams
(74) *Attorney, Agent, or Firm* — Bridgeway IP Law Group, PLLC; Sang Ho Lee; Hyun Woo Shin (57) ABSTRACT

Provided is a multi-wavelength wireless optical charging system, which includes: a transmitter splitting low-power light of a predetermined threshold value or less into a predetermined range of wavelengths and transmitting the split light onto a space; and a receiver receiving the light transmitted from the transmitter and generating energy from multi-wavelength light which is light corresponding to a plurality of predetermined wavelengths in the received light to charge a device.

17 Claims, 11 Drawing Sheets

MULTI-WAVELENGTH WIRELESS OPTICAL CHARGING SYSTEM AND METHOD

CROSS-REFERENCE TO RELATED APPLICATIONS

This application claims the priority of Korean Patent Application No. 10-2021-0192389 filed on Dec. 30, 2021, in the Korean Intellectual Property Office, the disclosure of which is incorporated herein by reference.

BACKGROUND

Field

The present disclosure relates to a charging system which charges a device by using multi-wavelength wireless light and transmits data to the device at the same time, and a method thereof.

Description of the Related Art

A magnetic induction scheme, which is currently commercialized most of the wireless charging technology, is a short-range charging scheme that can be charged only in case of being contacted with a charger within 1 cm. Alternatively, a magnetic resonance scheme proposed to complement the magnetic induction scheme is that since magnetism is delivered to a matching frequency by using a resonance frequency, even if a device is not close to the charger, the device can be charged, and even if there is another object in the middle, there is an advantage of not interfering with the charging, but if the device and the charger are separated from each other by 1 m or more, efficiency is rapidly reduced.

In order to overcome the problems, an RF electromagnetic wireless charging scheme and a wireless charging scheme using light are being researched, but the application thereof is limited due to a human body harmfulness problem of an electromagnetic wave.

Therefore, a need for a multi-wavelength wireless optical charging system and a method thereof capable of solving the human body harmfulness problem is being emerged.

SUMMARY

An object to be achieved by the present disclosure is to provide a multi-wavelength wireless optical charging system and a method thereof which reduce reflection light reflected on an optical receiver by using multi-wavelength wireless light to relieve a human harmfulness problem.

According to an aspect of the present disclosure, there is provided a multi-wavelength wireless optical charging system, which includes: a transmitter splitting low-power light of a predetermined threshold value or less into a predetermined range of wavelengths and transmitting the split light onto a space; and a receiver receiving the light transmitted from the transmitter, and generating energy from multi-wavelength light which is light corresponding to a plurality of predetermined wavelengths in the received light to charge a device.

Preferably, the receiver may include a retroreflector receiving the multi-wavelength light corresponding to the plurality of wavelengths in the received light and reflecting a part of the received multi-wavelength light toward the transmitter, and an energy conversion unit converting light corresponding to the remaining light of the received multi-wavelength light into electric energy.

Preferably, the transmitter may generate and transmit the low-power light based on data to be transmitted, and the receiver may generate the electric energy from a part of the received light and convert another part of the received light into received data.

Preferably, the transmitter may include a light source unit generating light, a transmission control unit converting the data to be transmitted into the low-power light and controlling flickering of the light emitted from the light source unit based on the low-power optical signal, and a light emitting unit splitting the light emitted by the light source unit and resonating with the receiver.

Preferably, the transmission control unit may include one or more external modulators provided on an output path of light split according to a wavelength from the light emitting unit, and a modulator driver controlling one or more external modulators based on the low-power optical signal.

Preferably, the light emitting unit may include a light wavelength splitter including any one of a diffraction grating, a prism, arrayed waveguide grating based Dense Wavelength Division Multiplexing (DWDM) and Coarse Wavelength Division Multiplexing (CWDM) demultiplexers to split the light received from the light source unit into wavelengths of a predetermined range and spatially outputting the light, a telescope unit formed at an output end of the light wavelength splitter and expanding a field of view (FOV), and a direction control unit receiving output information of the light output from the light source unit and controlling a direction of the light wavelength splitter.

Preferably, the light source unit may be an optical fiber amplifier or laser utilizing a gain optical fiber, the optical fiber amplifier may include a pump laser, a light wavelength coupler, and the circulator, light output from the pump laser may be output to the receiver through the circulator, and partial light returned from the receiver may be coupled through the light wavelength coupler to output amplified light.

Preferably, the light source unit may be the optical fiber amplifier or laser utilizing the gain optical fiber, the optical fiber amplifier may include the pump laser, the light wavelength coupler, and a mirror, and the light wavelength coupler may be disposed in a portion where an output of the pump laser and light reflected from the mirror meet and may adjust a reflective rate of the mirror to adjust output voltage.

Preferably, the light source unit may be the optical fiber amplifier or laser utilizing the gain optical fiber, the optical fiber amplifier may include the pump laser, the light wavelength coupler, and a fiber Bragg grating (FBG) reflector, and the fiber Bragg grating (FBG) reflector may adjust a reflective index of the optical fiber to adjust the output voltage and adjust even a bandwidth of an output signal.

Preferably, when the light wavelength splitter is any one of Dense Wavelength Division Multiplexing (DWDM) or Coarse Wavelength Division Multiplexing (CWDM) demultiplexers, the receiver may be disposed in multiple spaces physically divided through the optical fiber and receive an optical signal.

Preferably, the receiver may include a retroreflector receiving the multi-wavelength light corresponding to the plurality of wavelengths in the received light and reflecting a part of the received multi-wavelength light toward the transmitter, an energy conversion unit converting the light corresponding to the remaining light of the received multi-wavelength light into electric energy, and a communication module decoding an optical signal corresponding to the remaining light of the received multi-wavelength light to a data signal.

Preferably, the communication module may include a voltage conversion unit converting the optical signal into voltage corresponding to current for the optical signal, a filter unit removing noise for the converted voltage, and an amplifier amplifying the voltage from which the noise has been removed.

Preferably, the retroreflector may include a plurality of ball lenses corresponding to the plurality of wavelengths, respectively.

Preferably, the receiver may further include an anti-reflection glass window positioned at a front end of the retroreflector and suppressing reflection of the light received from the transmitter.

Preferably, the anti-reflection glass window may have a dome shape which is convex toward the transmitter.

Preferably, in the plurality of ball lenses, in order to increase the power of the light reflected toward the transmitter, a predetermined region may be high-reflection coated or made of a material in which a reflective index is equal to or more than a predetermined reference value.

According to an aspect of the present disclosure, there is provided a multi-wavelength wireless optical charging method, which includes: receiving, by a transmitter, current, and splitting low-power light of a predetermined threshold value or less into a predetermined range of wavelengths and transmitting the split light onto a space; receiving, by a receiver, the light transmitted from the transmitter; reflecting, by the receiver, a part of multi-wavelength light corresponding to a plurality of predetermined wavelengths in the received light toward the transmitter, and converting, by the receiver, light corresponding to the remaining light of the received multi-wavelength light into electric energy to charge a device.

Preferably, the reflecting toward the transmitter may be performed by the plurality of ball lenses included in the receiving unit and corresponding to the plurality of wavelengths, respectively.

Preferably, the low-power light of the threshold value or less may be generated based on data to be transmitted, and in the charging of the device, the receiver may convert a part of the light corresponding to the remaining light of the received multi-wavelength light into the electric energy and convert another part into received data.

Preferably, the splitting and transmitting the light onto the space, the data to be transmitted may be converted into the low-power light and the data may be transmitted by controlling flickering of light based on the low-power optical signal.

According to the present disclosure, there is an effect that by focusing and using multi-wavelength wireless light, power having a larger output than power transmission by one wavelength is supplied, and reflection light reflected on an optical receiver is reduced to relieve a human harmfulness problem, at the same time.

Further, according to the present disclosure, there is an effect that power and data can simultaneously be delivered to a plurality of receivers positioned remotely.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

The present disclosure may be variously modified and have various embodiments and specific exemplary embodiments will be described in detail with reference to drawings. However, this does not limit the present disclosure to specific exemplary embodiments, and it should be understood that the present disclosure covers all the modifications, equivalents and replacements included within the idea and technical scope of the present disclosure. In describing each drawing, reference numerals refer to like elements.

Terms including as first, second, A, B, and the like are used for describing various constituent elements, but the constituent elements are not limited by the terms. The terms are used only to discriminate one element from another element. For example, a first component may be referred to as a second component, and similarly, the second component may be referred to as the first component without departing from the scope of the present disclosure. A term 'and/or' includes a combination of a plurality of associated disclosed items or any item of the plurality of associated disclosed items.

It should be understood that, when it is described that a component is "connected to" or "accesses" another component, the component may be directly connected to or access the other component or a third component may be present therebetween. In contrast, when it is described that a component is "directly connected to" or "directly accesses" another component, it is understood that no element is present between the element and another element.

Terms used in the present application are used only to describe specific exemplary embodiments, and are not intended to limit the present disclosure. A singular form includes a plural form if there is no clearly opposite meaning in the context. In the present application, it should be understood that the term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

If not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

Throughout the specification and claims, unless explicitly described to the contrary, a case where any part "includes" any component will be understood to imply the inclusion of stated components but not the exclusion of any other component.

Hereinafter, the present disclosure will be described in detail with reference to the accompanying drawings.

Figure 1:
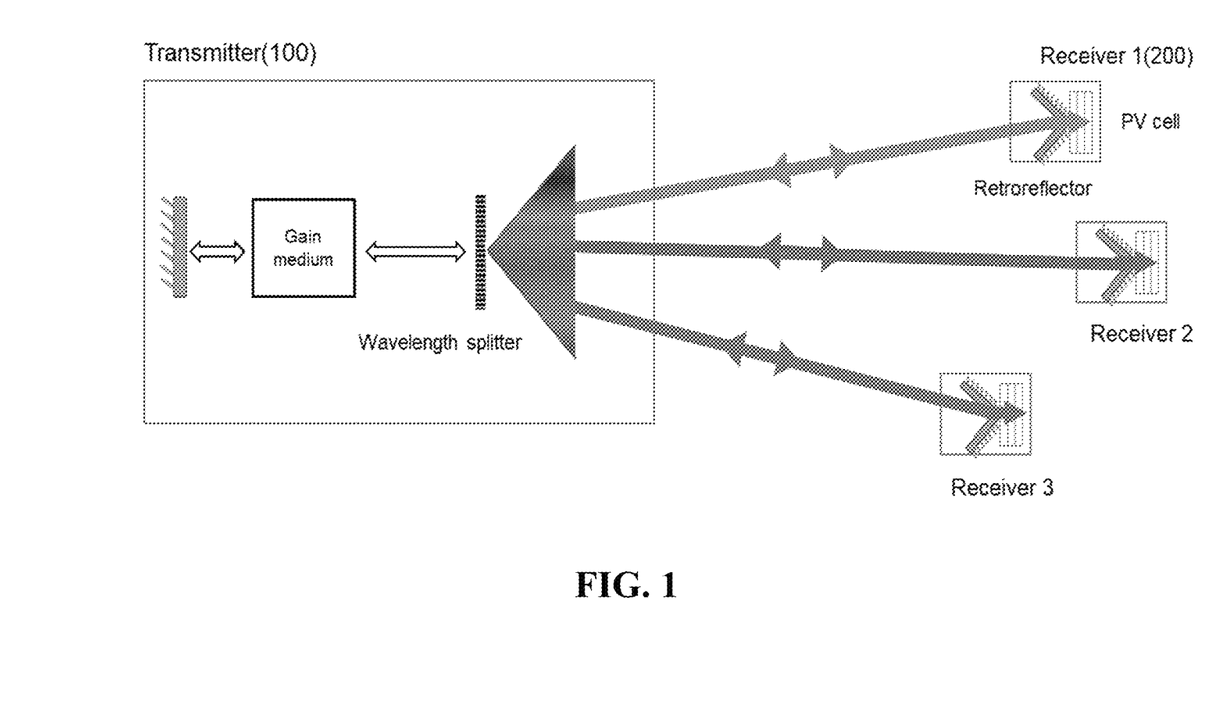
FIG. 1 is a diagram for describing a multi-wavelength wireless optical charging system according to an exemplary embodiment of the present disclosure.

FIG. 1 is a diagram for describing a multi-wavelength wireless optical charging system according to an exemplary embodiment of the present disclosure.

Referring to FIG. 1, the multi-wavelength wireless optical charging system according to an exemplary embodiment of the present disclosure includes a transmitter 100 and a receiver 200.

The transmitter 100 splits low-power light of a predetermined threshold value or less into a predetermined range of wavelengths and transmits the split light onto a space.

For example, referring to FIG. 1, the transmitter 100 may include a mirror, a gain medium, and a wavelength splitter. In this case, the gain medium may generate the light by receiving power and resonance may be achieved through light reflection of the mirror and the receiver 200. Further, the wavelength splitter may split the low-power light harmless to a human body, which is a predetermined threshold value (e.g., maximum permissible exposure (MPE)) or less into the predetermined range of wavelengths and transmit the split light onto the space.

In this case, when the light transmitted by the transmitter 100 onto the space is not received by the receiver 200, the resonance is not generated, so only low-output light power may be transmitted. On the contrary, when the light is received by the receiver 200, the resonance is generated, so high-output energy may be supplied to the receiver 200.

Meanwhile, a plurality of receivers may be present in the multi-wavelength wireless optical charging system according to an exemplary embodiment of the present disclosure, and for convenience, one receiver 200 will be described.

The receiver 200 receives the light transmitted from the transmitter 100 and generates electric energy from multi-wavelength light which is light corresponding to a plurality of predetermined wavelengths in the received light to charge a device.

Figure 2:
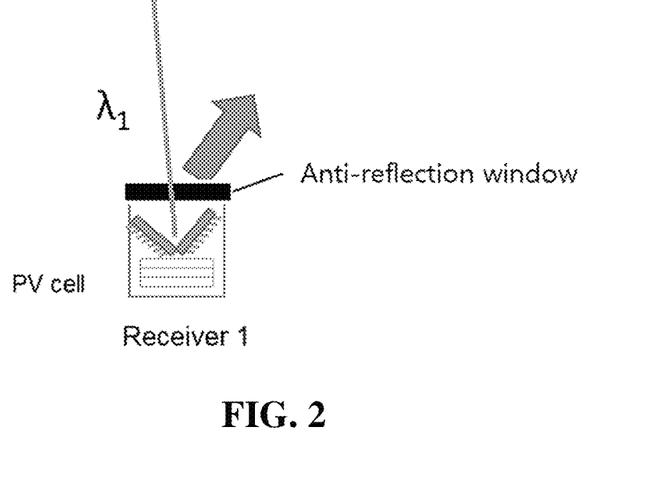
FIG. 2 is a diagram for describing a receiver in the related art.

In this case, referring to FIG. 2, in the related art, the receiver may generate electric energy by using light of one wavelength corresponding to $\lambda_1$ and charge the device by using the generated energy.

Figure 3:
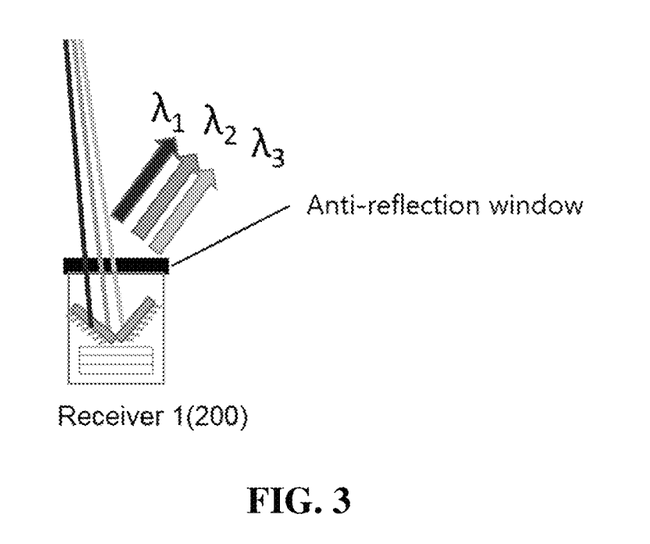
FIG. 3 is a diagram for describing a receiver according to an exemplary embodiment of the present disclosure.

However, referring to FIG. 3, the receiver 200 of the present disclosure may generate electric energy by using light of a plurality of wavelengths corresponding to $\lambda_1$, $\lambda_2$, and $\lambda_3$ and charge the device by using the generated energy. That is, the receiver 200 of the present disclosure may generate electric energy by using light corresponding to the plurality of predetermined wavelengths according to an internal structure. In this case, in the present disclosure, the plurality of wavelengths is not limited to three wavelengths.

Meanwhile, the detailed structure of the receiver 200 will be described below in detail in the description of FIG. 4.

As such, since the multi-wavelength wireless optical charging system according to an exemplary embodiment of the present disclosure delivers the power by focusing light of multiple wavelengths on the receiver 200, the multi-wavelength wireless optical charging system may supply power having a larger output than the power transmitted by one wavelength, and simultaneously, also reduce the reflection light.

Figure 4:
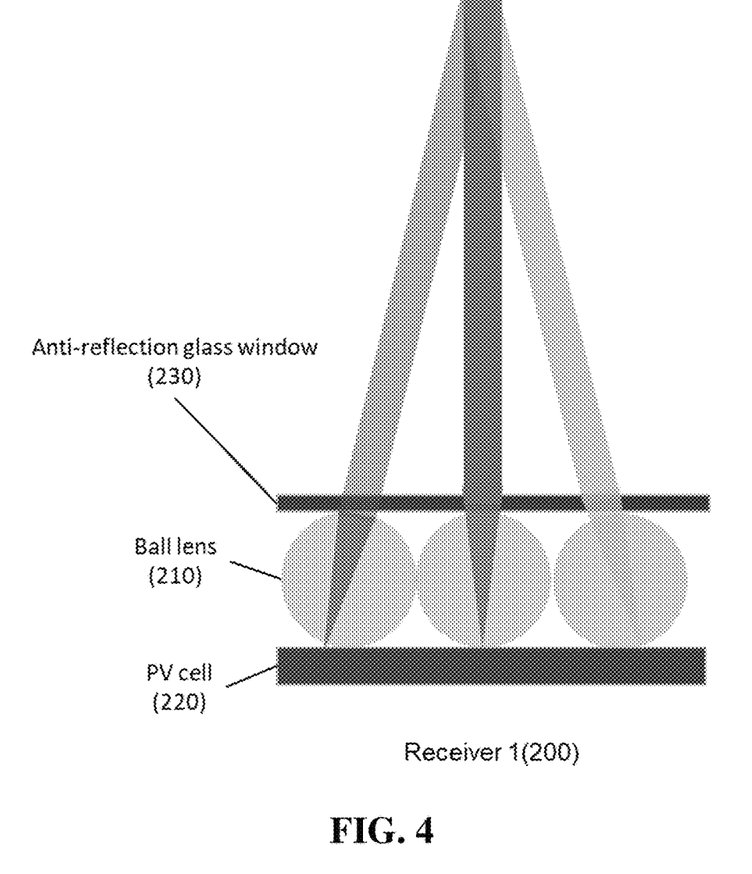
FIGS. 4 and 5 are diagrams for describing a detailed structure of the receiver according to an exemplary embodiment of the present disclosure.

FIG. 4 is a diagram for describing a detailed structure of the receiver according to an exemplary embodiment of the present disclosure.

Referring to FIG. 4, the receiver 200 according to an exemplary embodiment of the present disclosure includes a retroreflector (ball lens) 210) and an energy conversion unit (PV cell) 220. Further, optionally, the receiver 200 may further include an anti-reflection glass window 230.

The retroreflector 210 receives multi-wavelength light corresponding to the plurality of wavelengths in the light received from the transmitter 100 and reflects a part of the received multi-wavelength light toward the transmitter 100.

The retroreflector 210 may reflect light which is parallel and opposite to the received light with respect the received light. In this case, the light reflected by the retroreflector 210 is transmitted to the transmitter 100 to be resonated. In this case, the retroreflector 210 may include a plurality of balls or cube type lenses in order to receive the multi-wavelength light corresponding to the plurality of wavelengths.

Meanwhile, the retroreflector 210 may reflect a part of the received light and absorb the remaining light. In this case, the light reflected by the retroreflector 210 may be used for resonance and the absorbed light may be used for charging the device.

In another exemplary embodiment, the retroreflector 210 may include a plurality of ball lenses corresponding to the plurality of wavelengths, respectively.

For example, it is assumed that the receiver 200 generates electric energy by using light of three wavelengths corresponding to $\lambda_1$, $\lambda_2$, and $\lambda_3$. In this case, the receiver 200 may include three ball lenses for three wavelengths, respectively.

More specifically, referring to FIG. 4, three ball lenses are included in the receiver 200 to absorb and reflect the light of three wavelengths displayed with different colors.

In yet another exemplary embodiment, in the plurality of ball lenses, in order to increase the power of the light reflected toward the transmitter 100, a predetermined region may be high-reflection coated or made of a material in which a reflective index is equal to or more than a predetermined reference value.

For example, when the number of ball lenses included in the receiver 200 increases, input power input into each ball lens is lowered and a returned reflection signal is also lowered, and as a result, power transmission by lasing may not be smooth.

Figure 5:
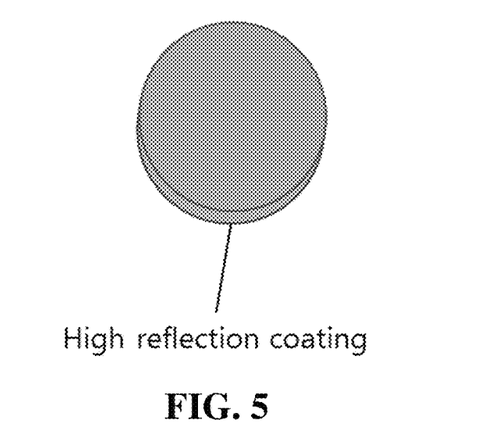

Therefore, in order to increase the power of the light returned to the transmitter 100, a material having a large reflective index may be used for the ball lens or a partial region of the ball lens may be high-reflection coated as in FIG. 5.

The energy conversion unit 220 converts light corresponding to the remaining light of the received multi-wavelength light into electric energy.

In this case, the energy conversion unit 220 includes a solar cell or a photovoltaic cell to convert the energy of the light absorbed through the retroreflector 210 into electric energy and charge the device by using the corresponding electric energy.

The anti-reflection glass window 230 is positioned at a front end of the retroreflector 210 to suppress the reflection of the light received from the transmitter 100.

Here, the anti-reflection glass window 230 is positioned between the retroreflector 210 and the transmitter 100 to suppress the reflection of the light received from the transmitter 100 to the outside. Therefore, it is possible to prevent the light reflected to the outside from exerting a harmful influence on the human body.

In another exemplary embodiment, the anti-reflection glass window 230 may have a dome shape which is convex toward the transmitter 100.

That is, referring to FIG. 5, the anti-reflection glass window 230 may be formed to have the convex dome shape toward the transmitter 100 in order to prevent a power density from being increased due to concentration of surface reflection in a specific direction.

Consequently, since the receiver 200 uses the multi-wavelength light, an output of the delivered light may be reduced compared to when light of one wavelength is used. As a result, the receiver 200 may reduce the reflection light and secure power having a larger output on the whole, and reduce the power density of the reflection light to obtain an effect of being capable of relieving a harmful problem of wireless power charging to the human body.

Figure 6:
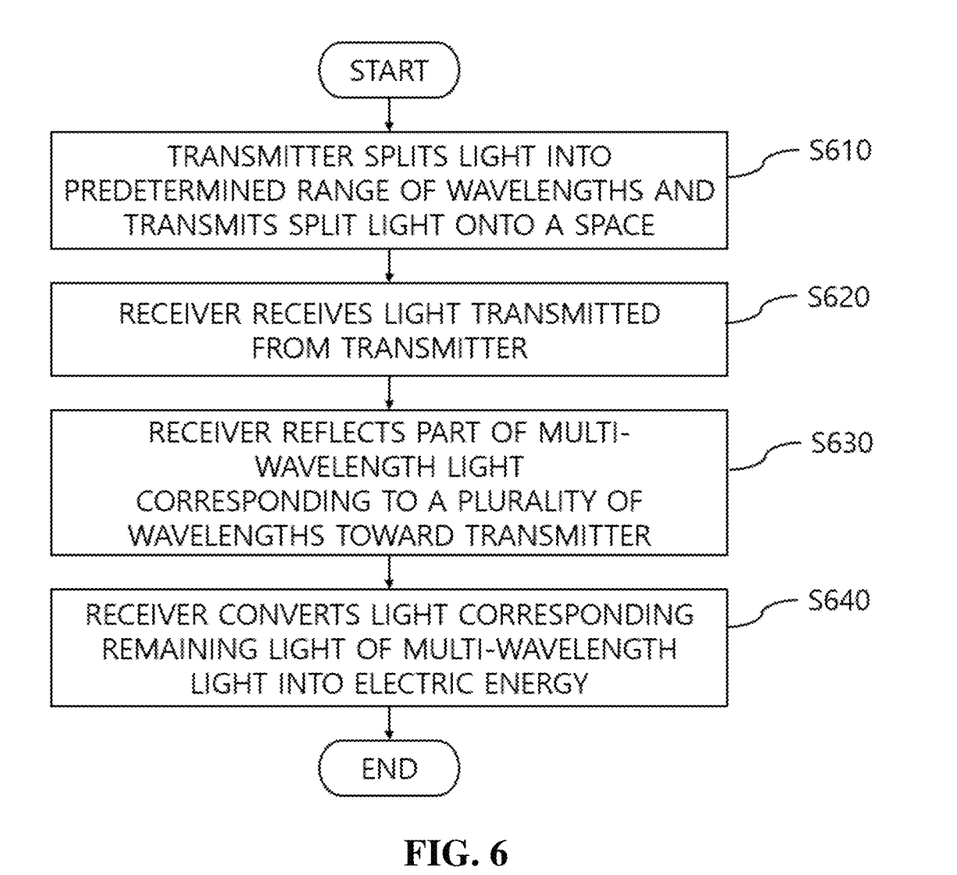
FIG. 6 is a flowchart for describing a multi-wavelength light charging method according to an exemplary embodiment of the present disclosure.

FIG. 6 is a flowchart for describing a multi-wavelength light charging method according to an exemplary embodiment of the present disclosure.

In step S610, a transmitter 100 receives current to split low-power light of a predetermined threshold value or less into a predetermined range of wavelengths and transmit the split light onto a space.

In step S620, a receiver 200 receives the light transmitted from the transmitter 100.

In step S6300, the receiver 200 reflects a part of multi-wavelength light corresponding to a plurality of predetermined wavelengths in the received light toward the transmitter 100.

In another exemplary embodiment, the receiver 200 may use a plurality of ball lenses corresponding to the plurality of wavelengths, respectively, when reflecting a part of the multi-wavelength light toward the transmitter 100.

Last, in step S640, the receiver 200 converts light corresponding to the remaining light of the multi-wavelength light into electric energy to charge a device.

In another exemplary embodiment, when the low-power light of the threshold value or less is light generated based on data to be transmitted, the receiver 200 may convert a part of the light corresponding to the remaining light of the multi-wavelength light into electric energy and convert another part into received data.

In yet another exemplary embodiment, the transmitter 100 may convert the data to be transmitted into the low-power light, and transmit the converted light by controlling flickering of the light based on a low-power optical signal.

Figure 7:
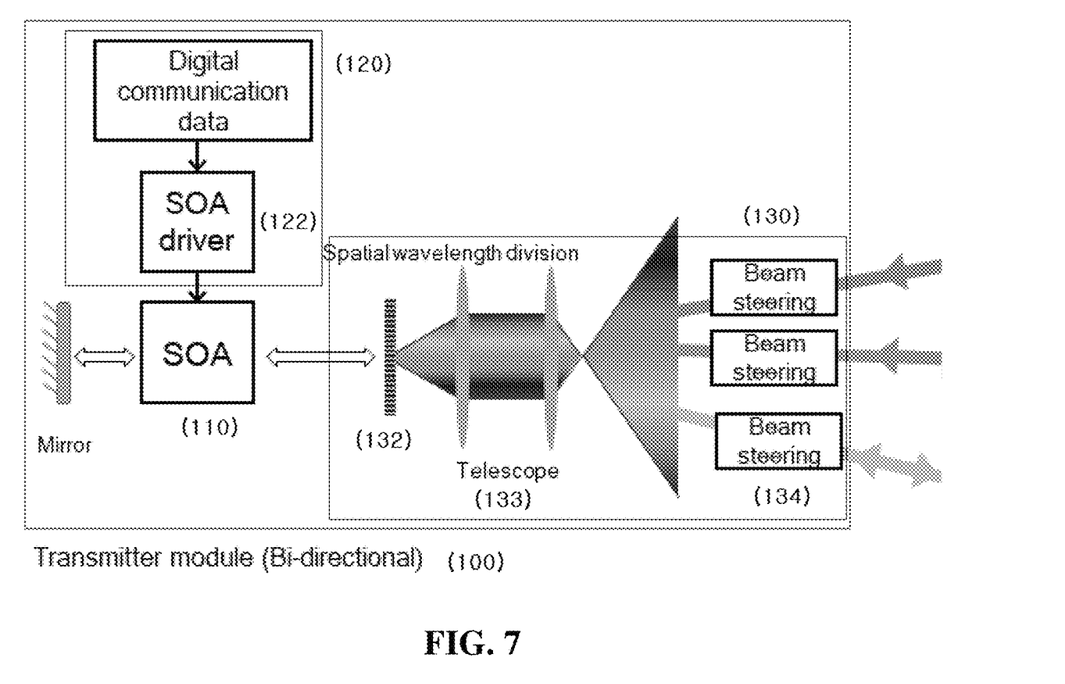
FIG. 7 is a diagram for describing a transmitter according to an exemplary embodiment of the present disclosure.

FIG. 7 is a diagram for describing a transmitter according to an exemplary embodiment of the present disclosure.

Referring to FIG. 7, the transmitter 100 according to an exemplary embodiment of the present disclosure may include a light source unit 110, a transmission control unit 120, and a light emitting unit 130.

The light source unit 110 generates light according to an instruction of the transmission control unit 120. In an exemplary embodiment, the light source unit 110 generates light and emits the light to the outside as a bidirectional semiconductor optical amplifier (SOA) (Innolume, SOA-1030-20-HI-40DB) having a full width at half maximum with center wavelengths 1033.6 nm and 21.9 nm is used, and current of 800 mA is applied to the SOA.

In another exemplary embodiment, the light source unit 110 may extend a field of view (FOV) by using multiple SOA light sources.

In yet another exemplary embodiment, as the light is incident in the light source unit 110, resonance may be made, and energy of the light may increase. For example, the light source unit 110 may include a gain medium, and the gain medium is applied with the power to generate light and amplify the power of the corresponding light.

In another exemplary embodiment, the light source unit 110 may further include an optical bandpass filter (not illustrated). In this case the optical bandpass filter may increase an optical signal to noise ratio (OSNR) of an incident optical signal by filtering the light incident in the light source unit 110.

The transmission control unit 120 may convert the data to be transmitted into an optical signal and control light emission of the light source unit 110 based on the converted optical signal, and include an SOA driver 122.

The transmission control unit 120 converts the data to be transmitted into an optical signal. The transmission control unit 120 may adopt both a direct modulation scheme and an external modulation scheme.

The direct modulation scheme may transmit the same data to the plurality of receivers 200 and the external modulation scheme may transmit different data for each wavelength, and as a result, different data may be transmitted to respective receivers 200.

In another exemplary embodiment, the transmission control unit 120 may use Manchester Encoding. The Manchester Encoding scheme as one of digital encoding schemes represents a scheme of expressing a data bit as the data bit is transited from one logical state to another state, and has a difference from a general encoding scheme of expressing one bit as one of a high value such as +5 V or a low value such as 0 V. That is, when the data to be transmitted is encoded through the Manchester Encoding scheme, a state of the bit may be determined according to a transition direction.

For example, in the Manchester Encoding scheme, a transition from a low state to a high state may indicate a high value (1) and a transition from a high state to a low state may indicate a low value (0), or vice versa.

In this case, the transmission control unit 120 adopts the Manchester encoding, but the present disclosure is not limited thereto, and the transmission control unit 120 may variously adopt encoding schemes used for visible light communication.

The transmission control unit 120 converts the encoded data into an optical signal for flickering the light source unit 110, and controls the flickering of the light source unit 110 based on the optical signal by the SOA driver 122.

The light emitting unit 130 splits the light emitted by the light source unit 110 or resonates with a receiving device.

The light emitting unit 130 may sequentially include a light wavelength splitter 132, a telescope unit 133, and a direction control unit 134.

The light wavelength splitter 132 may spatially split the light output from the light source unit 110. In this case, the light wavelength splitter 132 may be any one of a diffraction grating, a prism, or an arrayed waveguide grating.

In an exemplary embodiment, the light of which wavelength is split from the light wavelength splitter 132 may have a small FOV.

The telescope unit 133 is constituted by two lenses, i.e., a first lens and a second lens to control an FOV.

The direction control unit 134 is disposed at an output end of the light wavelength splitter 132 to control a direction of an output of the light wavelength splitter 132.

In another exemplary embodiment, the light emitting unit 130 may further include at least any one of a collimator (not illustrated) and a width extension unit (not illustrated).

The collimator converts the light output from the light source unit 110 into a parallel beam.

The width extension unit extends a width of light in order to increase a reflective rate of the light incident in the retroreflector of the receiver before the light output from the light source unit 110 is input into the light wavelength splitter 132.

As such, all receivers 200 may receive the same data by the transmitter 100 according to an exemplary embodiment of the present disclosure.

Figure 8:
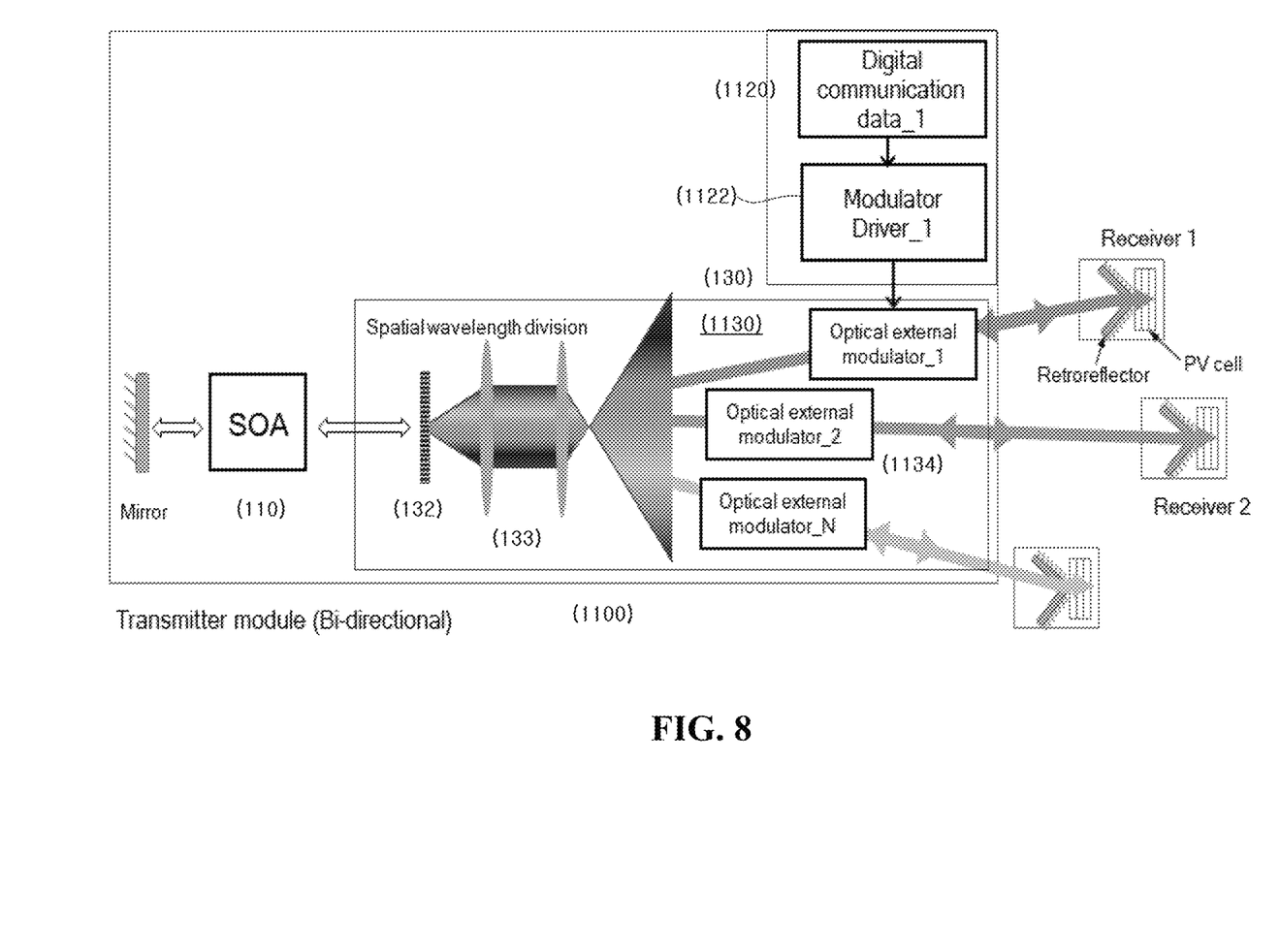
FIG. 8 is a diagram for describing a transmitter according to another exemplary embodiment of the present disclosure.

FIG. 8 is a diagram for describing a receiver according to another exemplary embodiment of the present disclosure.

The same component as FIG. 7 is denoted by the same reference numeral, and a detailed description is omitted.

Referring to FIG. 8, the transmitter 1100 according to another exemplary embodiment of the present disclosure may include a light source unit 110, a transmission control unit 1120, and a light emitting unit 1130.

The light source unit 110 generates light according to an instruction of the transmission control unit 1120.

The light emitting unit 1130 splits the light emitted by the light source unit 110 or resonates with a receiving device.

The light emitting unit 1130 may sequentially include a light wavelength splitter 132 and a telescope unit 133.

The transmission control unit 1120 converts data to be transmitted into an optical signal, and controls flickering of the light split and output from the light emitting unit 1130 according to the wavelength based on the optical signal.

The transmission control unit 1120 may further include an external modulator 1134 and a modulator driver 1122.

One or more external modulators 1134 are provided on an output path of the light split according to the wavelength from the light emitting unit 1130 to modulate the beam.

The modulator driver 1122 may control one or more external modulators based on the optical signal. In this case, one modulator driver 1122 may control a plurality of external modulators.

The light wavelength splitter 132 may spatially split the light output from the light source unit 110. In this case, the light wavelength splitter 132 may be any one of a diffraction grating, a prism, or an arrayed waveguide grating.

In an exemplary embodiment, the light of which wavelength is split from the light wavelength splitter 132 may have a small FOV.

The telescope unit 133 is constituted by two lenses, i.e., a first lens and a second lens to control the FOV.

In an exemplary embodiment, an angle β of light finally diffused to a space may be larger than an angle α of light diffused from the diffraction grating. That is, the FOV may be determined by the second lens. Consequently, dependency of the FOV may move from selection of a diffraction grating or SOA parameter to selection of the second lens.

In another exemplary embodiment, the second lens may be selected in a design step and may be adjusted in real time by using a variable focus lens in order to realize a desired FOV. It is described that the telescope unit 133 is constituted by two lenses constituted by the first lens and the second lens for FOV enhancement, but the telescope unit 133 may be constituted by four lenses further including two lenses (a pair of telescope units) in order to further enhance the FOV.

The direction control unit 160 controls the direction of light passing through the telescope unit 133 based on a mirror to deliver the corresponding light to the receiver 200. In this case, the receiver 200 may be a reverse reflection beam splitter which completes a resonance channel reflecting a narrow band of the light returning to the transmitter 100 and simulating excitement of a light source therein.

As such, the transmitter 100 according to another exemplary embodiment of the present disclosure may transmit different data to different receivers 200.

Figure 9:
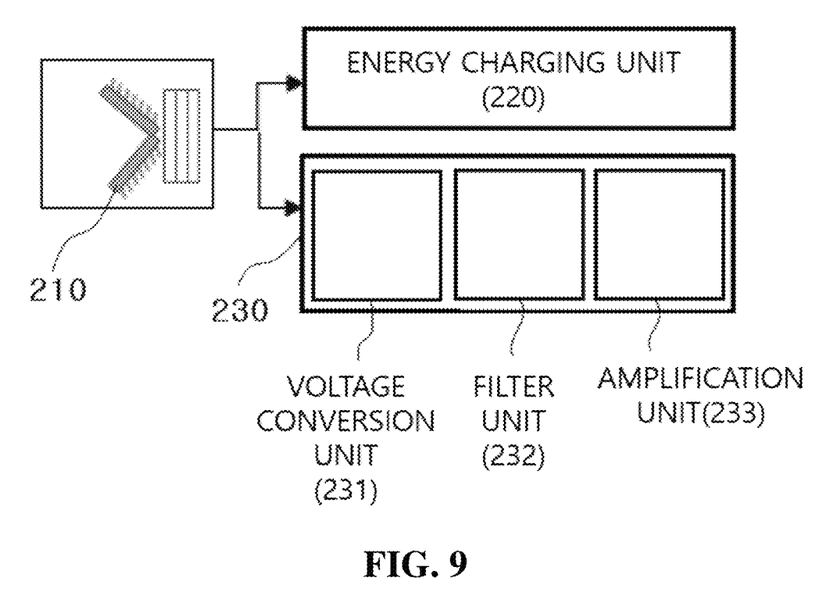
FIG. 9 is a diagram for describing a receiver according to another exemplary embodiment of the present disclosure.

FIG. 9 is a diagram for describing a receiver according to another exemplary embodiment of the present disclosure.

Referring to FIG. 9, the receiver 200 according to another exemplary embodiment of the present disclosure may include a retroreflector 210, an energy conversion unit 220, and a communication module 230.

The retroreflector 210 serves to reflect incident angle at the same angle. For example, the retroreflector 210 may be arrayed in a cube form, and may have a predetermined interval at a center. In this case, the predetermined interval may be 4 mm. Further, the receiver 200 may split a part of a light source according to a power division ratio of the retroreflector 210.

In an exemplary embodiment, since the retroreflector 210 of the receiver 200 returns the direction of the optical beam with an incident trajectory regardless of the incident angle, the retroreflector 210 may be easily aligned. For example, as the retroreflector 210 of the receiver 200, a ball lens type spherical retroreflector may be used, which reversely reflects only a corner cube or a part of a beam and transmits approximately 80% thereof. Here, the ball lens generates resonance for a partial wavelength of light incident in a spherical shape.

In another exemplary embodiment, as the retroreflector 210, a micro ball lens array, i.e., an array in which several ball lenses are arrayed in a row may be used. In this case, if the light incident in the retroreflector 210 has an ignorable spot size, the reflected beam may not be returned along an incident path but may be reflected in parallel to the incident path.

Meanwhile, it may be difficult to set a self-alignment mechanism between the transmitter 100 and the receiver 200. For example, when the beam is not self-aligned, the beam may not be coupled to the transmitter 100 module again and a broken cavity may be generated.

In this case, when the spot size of an incident beam is similar to a pitch of the retroreflector 210, the generation of the broken cavity may be relieved. That is, when the spot size is increased, the self-alignment may be increased, but self-alignment efficiency may still be determined according to the incident angle. For example, power efficiency of the retroreflector 210 may be reduced as the incident angle increases, and may be dependent on an acceptance angle of the retroreflector 210.

Further, when power having high power is incident in the retroreflector 210, a problem in that a temperature of a cell increases may occur. Accordingly, in order to solve the problem, an optical diffuser is disposed after the retroreflector 210, and as a result, light is uniformly sprayed into a space to be incident on the cell. In this case, the optical diffuser evenly distributes light throughout the surface to minimize or remove a high intensity bright spot.

The energy conversion unit 220 may detect light which is not reflected but passes through an interval of a center cell in the incident light and convert the detected light into electric energy. For example, the energy conversion unit 220 includes a solar cell or a photovoltaic cell to detect the light passing through the interval of the center cell, convert the energy of the corresponding light into electric energy, and charge the receiver 200 with the corresponding electric energy.

The communication module 230 may extract an AC signal of the optical signal and decode the optical signal to a data signal. For example, when the transmitter 100 performs the Manchester encoding, the communication module 230 may adopt a Manchester decoding scheme.

In another exemplary embodiment, the communication module 230 may include a voltage conversion unit 231, a filter unit 232, and an amplification unit 233. The voltage conversion unit 231 may convert the received optical signal into voltage corresponding to current for the optical signal. The filter unit 232 may remove noise for the converted voltage and include a high pass filter for removing the noise. The amplification unit 233 may amplify the voltage from which the noise is removed.

FIGS. 10A to 10D are diagrams illustrating a transmitter according to yet another exemplary embodiment of the present disclosure.

According to an exemplary embodiment, the light source unit 110 may include an optical fiber laser or an optical fiber amplifier instead of the SOA. According to various exemplary embodiments, the optical fiber amplifier as an optical fiber amplifier in which a low-level rare earth halide is added to a medium is capable of adjusting an output throughout a wide range to output light in a broadband. For example, the optical fiber laser may be constituted by Erbium, Ytterbium or Erbium and Ytterbium doped fiber.

According to an exemplary embodiment, as the light source unit includes the optical fiber amplifier instead of the SOA, the light source unit may further include a pump laser and a light wavelength coupler.

The pump laser may add external few light to a single mode optical fiber, and the light wavelength coupler may couple a wavelength to the light added in the pump laser and the light of the single mode optical fiber.

Figure 10A:
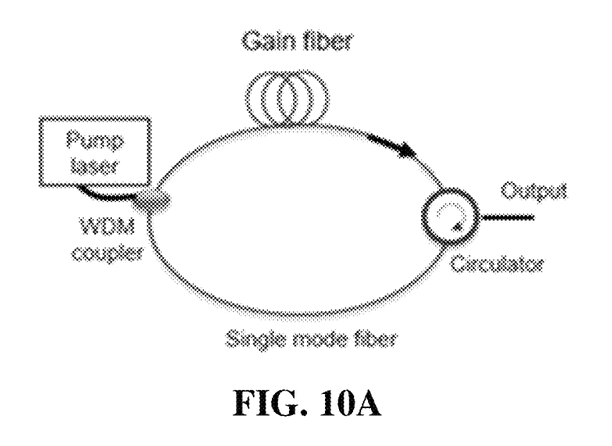
FIGS. 10A to 10D are diagrams illustrating a transmitter according to yet another exemplary embodiment of the present disclosure.

FIG. 10A illustrates a unidirectional light source unit, and a circulator sets an optical path in which resonance occurs.

Figure 10B:
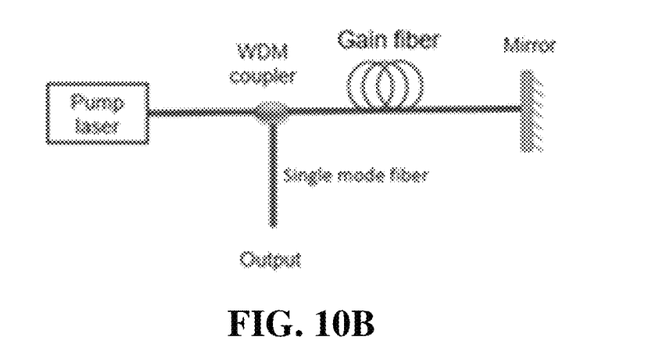
Figure 10C:
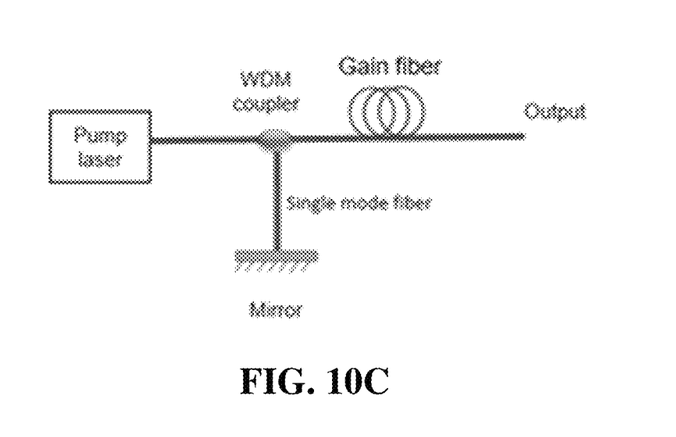
Figure 10D:
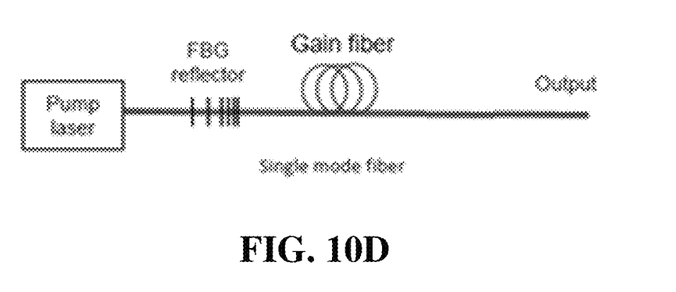

In FIGS. 10B, 10C, and 10D, the pump laser is a bidirectional light source unit, and the circulator may be omitted, so FIGS. 10B, 10C, and 10D may be more advantageous than 10A in terms of cost.

FIGS. 10B and 10C illustrate another exemplary embodiment, and a reflective rate of a mirror is adjusted to allow an output of the AWG based DWDM or CWDM demultiplexer to become low-output power safe to the human body. FIG. 10B illustrates a structure of a case where an amplified spontaneous emission (ASE) output is larger than FIG. 10C, and when a small output is desired, the structure of FIG. 10C may be implemented.

In FIG. 10D, a fiber Bragg grating (FBG) reflector is included between the pump laser and the output without a WDM combiner, and pump laser light is transferred to a gain optical fiber and an FBG structure may be inserted for resonance of a specific wavelength band, and a desired bandwidth and a reflective rate may be adjusted.

The fiber Bragg grating (FBG) reflector is manufactured by a short segment of an optical fiber which reflects light of a specific wavelength, and transmits light of other wavelengths. This is acquired by causing a periodic change in a reflective index of the optical fiber which generates the wavelength in a specific dielectric mirror.

Figure 11A:
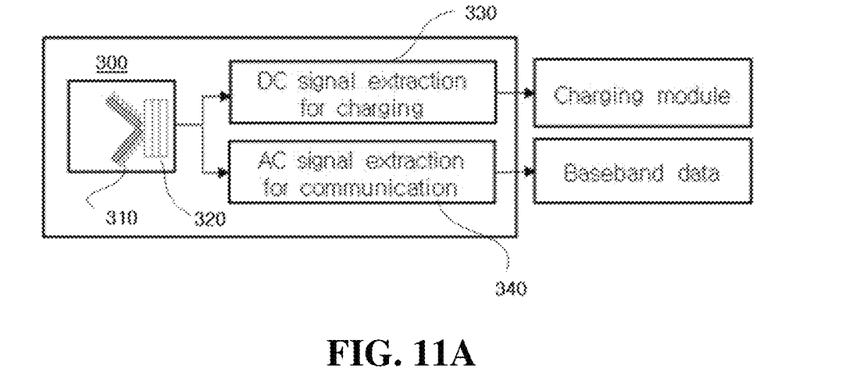
FIGS. 11A to 11C are diagrams illustrating a receiver according to another exemplary embodiment of the present disclosure.
Figure 11B:
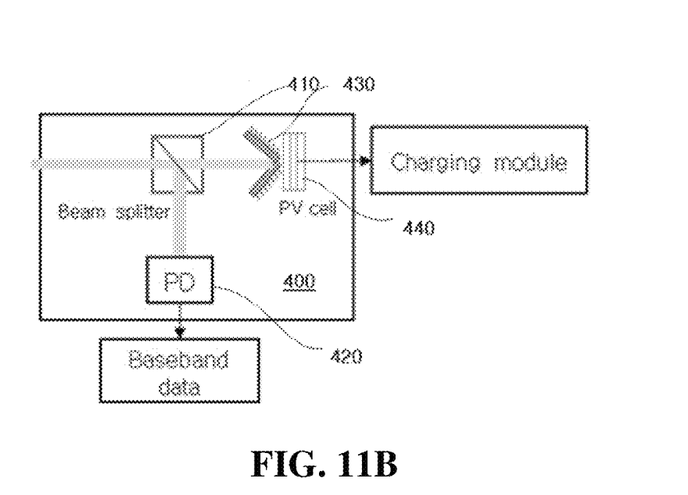
Figure 11C:
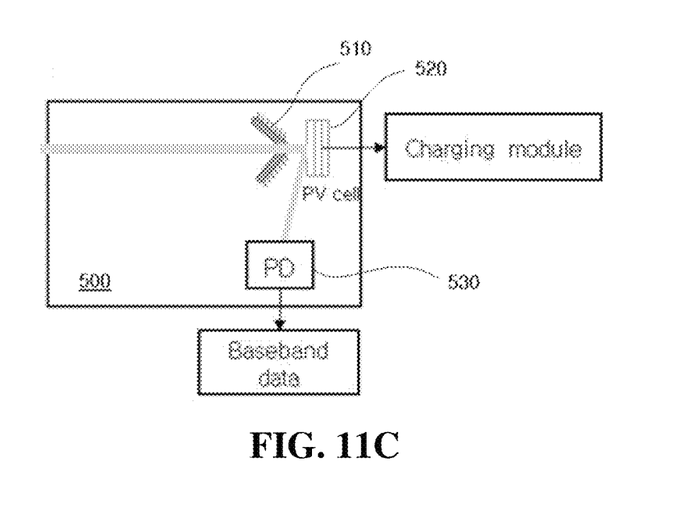

FIGS. 11A to 11C are diagrams illustrating a receiver according to another exemplary embodiment of the present disclosure.

The receiver of FIG. 11A includes a retroreflector 310, a photovoltaic cell 320, a DC signal extractor 330, and an AC signal extractor 340, and extracts a DC signal and an AC signal from light incident on the photovoltaic cell, performs charging based on the DC signal, and performs communication based on the AC signal.

Receivers 400 and 500 of FIGS. 11B and 11C may further include photodiodes 420 and 530. The photodiodes 420 and 530 may perform a function with smaller light by comparing with a photovoltaic cell 440.

The receiver 400 of FIG. 11B may split a part of a light source received by a beam splitter 410 into the photodiode 420, and the photovoltaic cell 440 receives the remaining light source through the retroreflector 430 and uses the remaining light source for charging. The photodiode 420 uses the received light for data communication.

The receiver 500 of FIG. 11C includes a retroreflector 510, a photovoltaic cell 520, and a photodiode 530. The photodiode 530 does not receive the split light source, and receives the light source reflected from the photovoltaic cell 520 and performs the data communication. As described above, since the photodiodes 530 may perform a function with smaller light by comparing with the photovoltaic cell 520, it is possible to perform the data communication. When the photodiode 530 uses reflection light of the photovoltaic cell 520 as such, the photovoltaic cell 520 may use more light sources than that in FIG. 11B, so it is more efficient.

Figure 12A:
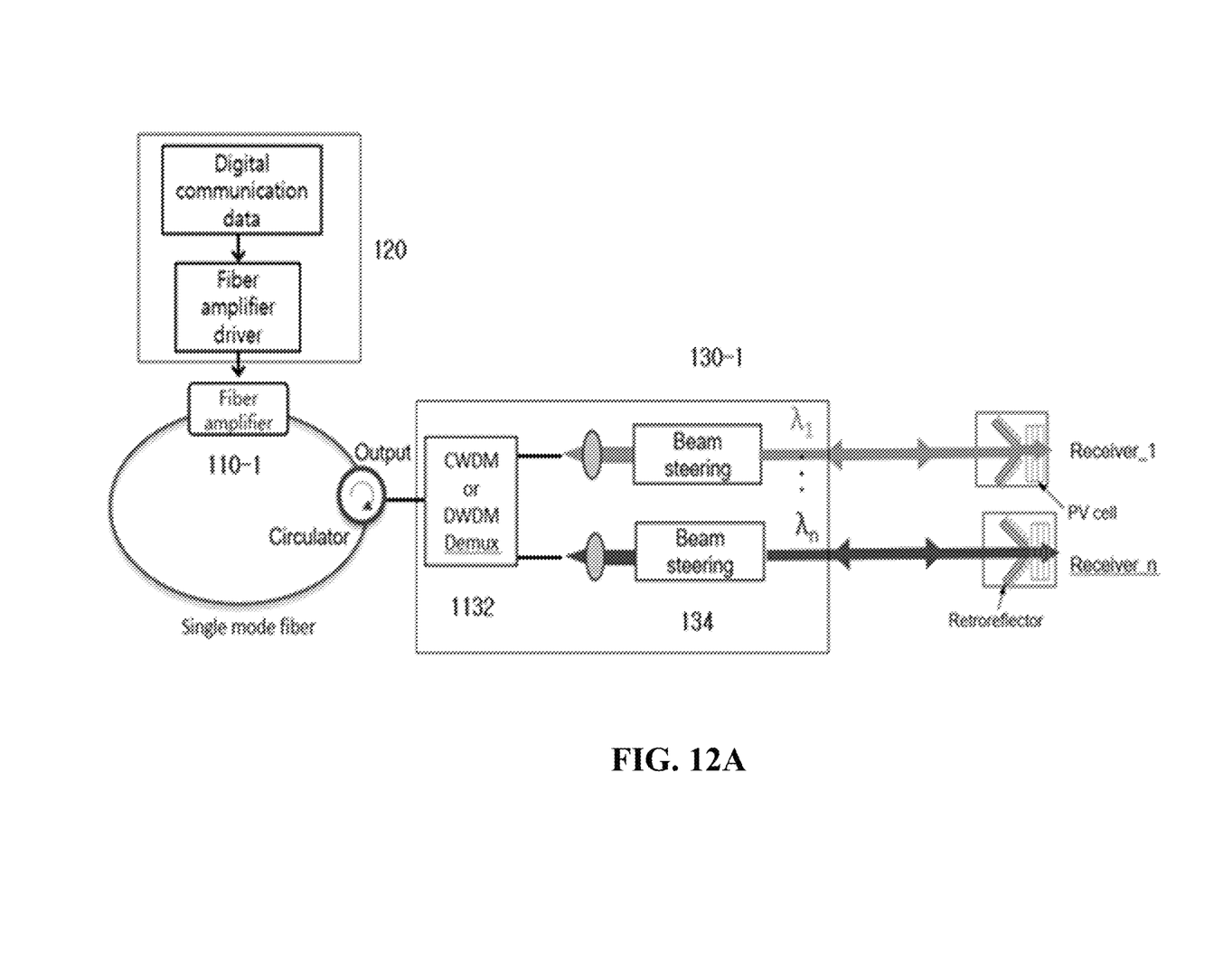
FIGS. 12A and 12B are diagrams illustrating a transmitter according to yet another exemplary embodiment of the present disclosure.
Figure 12B:
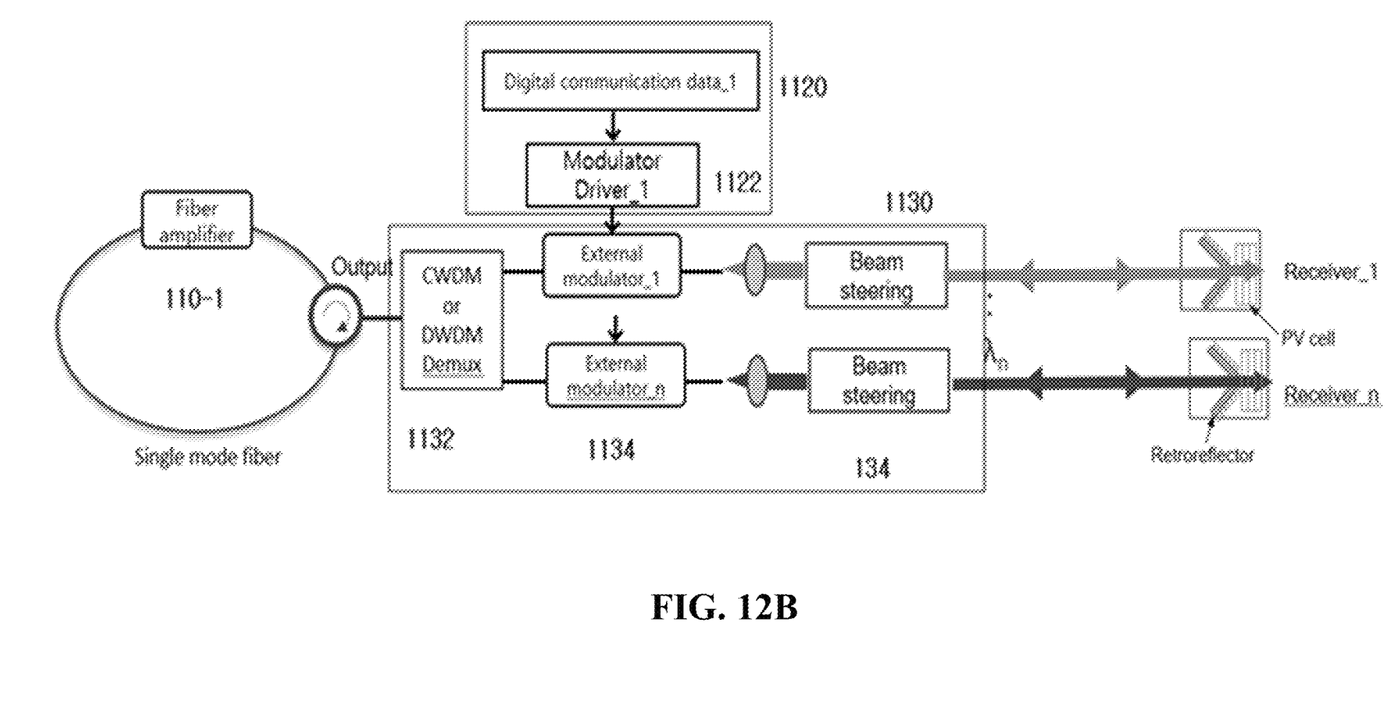

FIGS. 12A and 12B are diagrams illustrating a transmitter according to yet another exemplary embodiment of the present disclosure.

Referring to FIG. 12A, the transmitter 100 may include a light source unit 110-1, a transmission control unit 120, and a light emitting unit 130-1.

The light source unit 110, as an optical fiber amplifier, generates light according to an instruction of the transmission control unit 120.

The light source unit 110 may further include the circulator.

The transmission control unit 120 may convert data to be transmitted into the optical signal, control light emission of the light source unit 110-1 based on the converted optical signal and include an optical fiber driver 122.

The light emitting unit 130 splits the light emitted by the light source unit 110 or resonates with a receiving device.

The light emitting unit 130-1 may sequentially include a light wavelength splitter 132 and a direction control unit 134.

The light wavelength splitter 1132 includes any one of Dense Wavelength Division Multiplexing (DWDM) or Coarse Wavelength Division Multiplexing (CWDM).

The light wavelength splitter 1132 may split and output the light into multiple lights having a lower output than the light output from the light emitting unit 130-1.

The direction control unit 134 is disposed at an output end of the light wavelength splitter 132 to control a direction of an output of the light wavelength splitter 132.

Referring to FIG. 12B, the transmitter 1100 may include a light source unit 110-1, a transmission control unit 1120, and a light emitting unit 1130.

The light source unit 110-1 generates light according to an instruction of the transmission control unit 1120.

The light emitting unit 1130 splits the light emitted by the light source unit 110-1 or resonates with a receiving device.

The light emitting unit 1130 may sequentially include a light wavelength splitter 1132 and an external modulator 1134.

The light wavelength splitter 1132 includes any one of Dense Wavelength Division Multiplexing (DWDM) or Coarse Wavelength Division Multiplexing (CWDM).

As such, when the light wavelength splitter 1132 is any one of Dense Wavelength Division Multiplexing (DWDM) and Coarse Wavelength Division Multiplexing (CWDM) demultiplexers, even in the case where the receiver is disposed in multiple spaces physically divided, charging may be performed by transmitting an optical signal through a long optical fiber.

The transmission control unit 1120 converts data to be transmitted into an optical signal, and controls flickering of the light split and output from the light emitting unit 1130 according to the wavelength based on the optical signal.

The transmission control unit 1120 may further include an external modulator 1134 and a modulator driver 1122.

One or more external modulators 1134 are provided on an output path of the light split according to the wavelength from the light emitting unit to modulate the ray.

The modulator driver 1122 may control the one or more external modulators based on the optical signal. One modulator driver 1122 may control a plurality of external modulators.

The above description just illustrates the technical spirit of the present disclosure and various changes, and modifications can be made by those skilled in the art to which the present disclosure pertains without departing from an essential characteristic of the present disclosure. Therefore, the embodiments of the present disclosure are provided for illustrative purposes only but not intended to limit the technical concept of the present disclosure. The scope of the technical concept of the present disclosure is not limited to the embodiment. The protective scope of the present disclosure should be construed based on the following claims, and all the technical concepts in the equivalent scope thereof should be construed as falling within the scope of the present disclosure.

What is claimed is:

1. A multi-wavelength wireless optical charging system comprising:
   a transmitter splitting low-power light of a predetermined threshold value or less into a predetermined range of wavelengths and transmitting the split light onto a space; and
   a receiver receiving the light transmitted from the transmitter and generating electric energy from multi-wavelength light which is light corresponding to a plurality of predetermined wavelengths in the received light to charge a device, the receiver comprising:
   a retroreflector receiving the multi-wavelength light corresponding to the plurality of wavelengths in the received light and reflecting a part of the multi-wavelength light toward the transmitter;
   an optical diffuser distributing light corresponding to the remaining light of the multi-wavelength light uniformly; and
   an energy conversion unit converting the light, distributed by the optical diffuser, into electric energy, and
   wherein the retroreflector comprises a plurality of ball lenses corresponding to the plurality of wavelengths, respectively.

2. The multi-wavelength wireless optical charging system according to claim 1, wherein the transmitter generates and transmits the low-power light based on data to be transmitted, and
   the receiver generates electric energy from a part of the received light and converts another part of the received light into received data.

3. The multi-wavelength wireless optical charging system according to claim 2, wherein the transmitter comprises:
   a light source unit generating light;
   a transmission control unit converting the data to be transmitted into low-power light, and controlling flickering of the light emitted from the light source unit based on a low-power optical signal; and
   a light emitting unit splitting the light emitted by the light source unit and resonating with the receiver.

4. The multi-wavelength wireless optical charging system according to claim 3, wherein the transmission control unit comprises:
   one or more external modulators provided on an output path of light split according to a wavelength from the light emitting unit; and
   a modulator driver controlling the one or more external modulators based on the low-power optical signal.

5. The multi-wavelength wireless optical charging system according to claim 3, wherein the light emitting unit comprises:
   a light wavelength splitter including any one of a diffraction grating, a prism, arrayed waveguide grating based Dense Wavelength Division Multiplexing (DWDM) and Coarse Wavelength Division Multiplexing (CWDM) demultiplexers to split the light received from the light source unit into wavelengths of a predetermined range and spatially outputting the light;
   a telescope unit formed at an output end of the light wavelength splitter and expanding a field of view (FOV); and
   a direction control unit receiving output information of the light output from the light source unit and controlling a direction of the light wavelength splitter.

6. The multi-wavelength wireless optical charging system according to claim 5, wherein when the light wavelength splitter is any one of Dense Wavelength Division Multiplexing (DWDM) or Coarse Wavelength Division Multiplexing (CWDM) demultiplexers, the receiver is disposed in multiple spaces physically divided through an optical fiber and receives an optical signal.

7. The multi-wavelength wireless optical charging system according to claim 3, wherein the light source unit is an optical fiber amplifier or laser utilizing a gain optical fiber,
   the optical fiber amplifier includes a pump laser, a light wavelength coupler, and a circulator,
   light output from the pump laser is output to the receiver through the circulator, and
   partial light returned from the receiver is coupled through the light wavelength coupler to output amplified light.

8. The multi-wavelength wireless optical charging system according to claim 3, wherein the light source unit is an optical fiber amplifier or laser utilizing a gain optical fiber,
   the optical fiber amplifier includes a pump laser, a light wavelength coupler, and a mirror, and
   the light wavelength coupler is disposed in a portion where an output of the pump laser and light reflected from the mirror meet and adjusts a reflective rate of the mirror to adjust output voltage.

9. The multi-wavelength wireless optical charging system according to claim 3, wherein the light source unit is an optical fiber amplifier or laser utilizing a gain optical fiber,
the optical fiber amplifier includes a pump laser, a light wavelength coupler, and a fiber Bragg grating (FBG) reflector, and
the fiber Bragg grating (FBG) reflector adjusts a reflective index of the optical fiber to adjust output voltage and adjust even a bandwidth of an output signal.

10. The multi-wavelength wireless optical charging system according to claim 2, wherein the receiver further comprises:
a communication module decoding an optical signal corresponding to the remaining light of the multi-wavelength light to a data signal.

11. The multi-wavelength wireless optical charging system according to claim 10, wherein the communication module comprises:
a voltage conversion unit converting the optical signal into voltage corresponding to current for the optical signal;
a filter unit removing noise for the converted voltage; and
an amplifier amplifying the voltage from which the noise is removed.

12. The multi-wavelength wireless optical charging system according to claim 1, wherein the receiver further comprises an anti-reflection glass window positioned at a front end of the retroreflector and suppressing reflection of the light received from the transmitter.

13. The multi-wavelength wireless optical charging system according to claim 12, wherein the anti-reflection window has a dome shape which is convex toward the transmitter.

14. The multi-wavelength wireless optical charging system according to claim 1, wherein in the plurality of ball lenses, in order to increase the power of the light reflected toward the transmitter, a predetermined region is high-reflection coated or made of a material in which a reflective index is equal to or more than a predetermined reference value.

15. A multi-wavelength wireless optical charging method comprising:
receiving, by a transmitter, current, and splitting low-power light of a predetermined threshold value or less into a predetermined range of wavelengths and transmitting the split light onto a space;
receiving, by a receiver, the light transmitted from the transmitter;
reflecting, by the receiver, a part of multi-wavelength light corresponding to a plurality of predetermined wavelengths in the received light toward the transmitter, and
converting, by the receiver, light corresponding to the remaining light of the multi-wavelength light into electric energy to charge a device,
wherein the reflecting toward the transmitter is performed by a plurality of ball lenses included in the receiver and corresponding to the plurality of wavelengths, respectively wherein the light corresponding to the remaining light of the multi-wavelength light is uniformly distributed by an optical diffuser included in the receiver before converting.

16. The multi-wavelength wireless optical charging method according to claim 15, wherein the low-power light of the threshold value or less is generated based on data to be transmitted, and
in the charging of the device, the receiver converts a part of the light corresponding to the remaining light of the multi-wavelength light into electric energy and converts another part into received data.

17. The multi-wavelength wireless optical charging method according to claim 16, wherein in the splitting and transmitting the light onto the space, the data to be transmitted is converted into low-power light and transmitted by controlling flickering of light based on a low-power optical signal.

* * * * *